United States Patent [19]

Ott et al.

[11] Patent Number: 4,940,025
[45] Date of Patent: Jul. 10, 1990

[54] STEAM GENERATOR UPPER SUPPORT HAVING THERMAL DISPLACEMENT COMPENSATION

[75] Inventors: Howard L. Ott, Kiski Township, Armstrong County; Steven A. Palm, N. Huntingdon, both of Pa.

[73] Assignee: Westinghouse Electric Corp., Pittsburgh, Pa.

[21] Appl. No.: 319,591

[22] Filed: Mar. 6, 1989

[51] Int. Cl.⁵ ............................................. F22B 37/24
[52] U.S. Cl. ...................................... 122/510; 165/81
[58] Field of Search .................... 122/510; 165/81, 82, 165/83

[56] References Cited

U.S. PATENT DOCUMENTS

| | | | |
|---|---|---|---|
| 3,771,499 | 11/1973 | Marroni, Jr. et al. | 122/510 |
| 4,101,288 | 7/1978 | Smith et al. | 165/82 |
| 4,286,549 | 9/1981 | Eisinger | 165/82 |
| 4,291,752 | 9/1981 | Bridgnell | 165/83 |
| 4,381,735 | 5/1983 | Brunner | 122/510 |
| 4,428,329 | 1/1984 | Rees | 122/510 |
| 4,583,584 | 4/1986 | Wepfer | 165/82 |
| 4,601,449 | 7/1986 | Sharbaugh | 248/58 |
| 4,688,628 | 8/1987 | Moldenhauer | 122/510 |
| 4,768,582 | 9/1988 | Wepfer | 165/82 |

OTHER PUBLICATIONS

"Plant-Wide Application Snubber Reduction at a Boiling Water Reactor"; C. S. Haynes and T. E. Bostrom; American Society of Mechanical Engineers, Pressure Vessel and Piping Division (Publication) PVP, v. 127, pp. 119-124, (Jun. 28-Jul. 2, 1987).

Primary Examiner—Edward G. Favors
Assistant Examiner—Denise Ferensic
Attorney, Agent, or Firm—Michael G. Panian

[57] ABSTRACT

A steam generator upper support arrangement provides restraint to the steam generator during operating and non-operating conditions, for loading forces resulting from seismic and postulated accident conditions, while allowing for free thermal expansion of the steam generator in the radial, lateral, and vertical directions. Four embodiments of the present invention are described. In a first embodiment, inclined bumpers are placed at predetermined angles with respect to the load path, such that as the steam generator is thermally displaced the placement and incline angles of the bumpers will compensate for the expansion and maintain a nominal gap therebetween. In a second embodiment, the variable shim mechanism comprised of cams, bumper rods, and a pivoted linkage between the steam generator and the building structure maintains the nominal gap for the required support. In the third embodiment, a single small snubber is utilized. A pair of opposed, pivotally mounted rigid links arranged in a V-shaped manner are connected between the steam generator and the building structure, their respective apexes joined by the ends of the snubber to resist the loading forces. In the fourth embodiment, a pair of frustoconical sliding shims are disposed between support blocks which are correspondingly slanted to provide a tapered opening for the sliding shims. The shims are pivotally connected to a driveshaft also pivotally connected to the steam generator such that the mechanism maintains a nominal gap between the generator support and the building structure at all times.

24 Claims, 9 Drawing Sheets

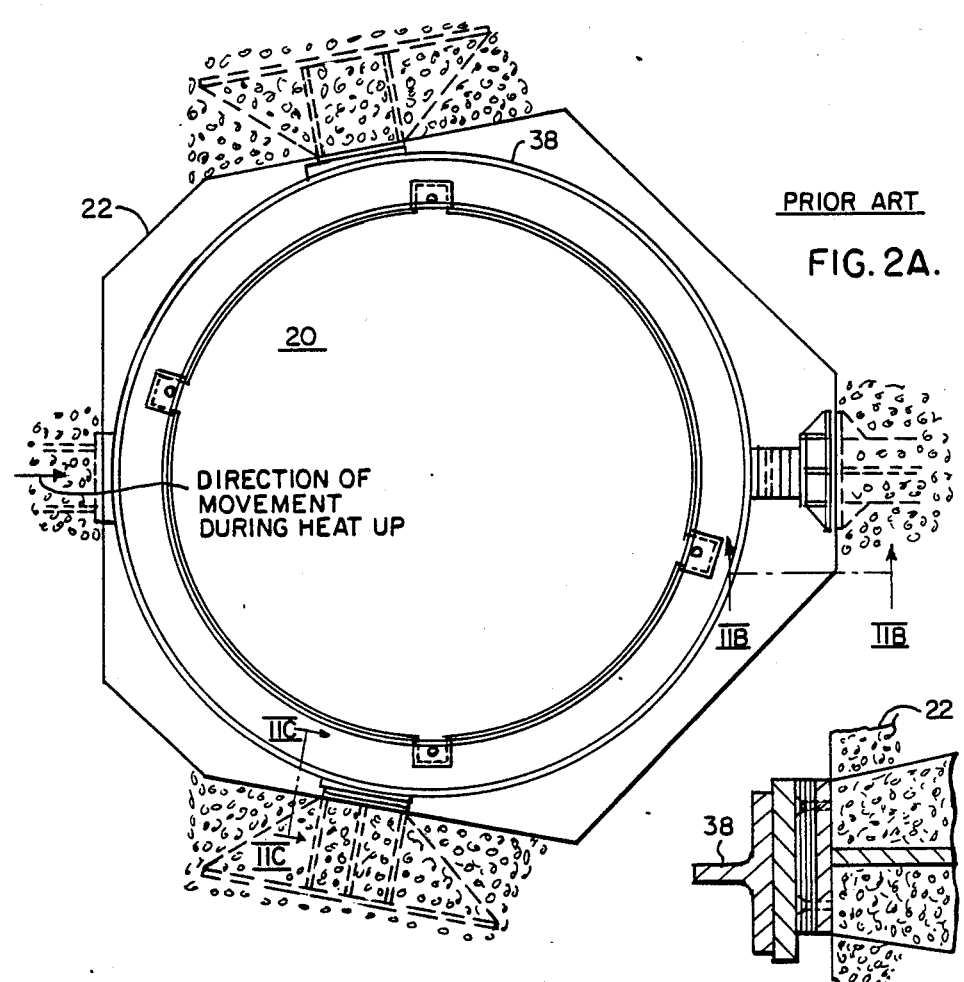
PRIOR ART
FIG. 2A.
FIG. 2C.
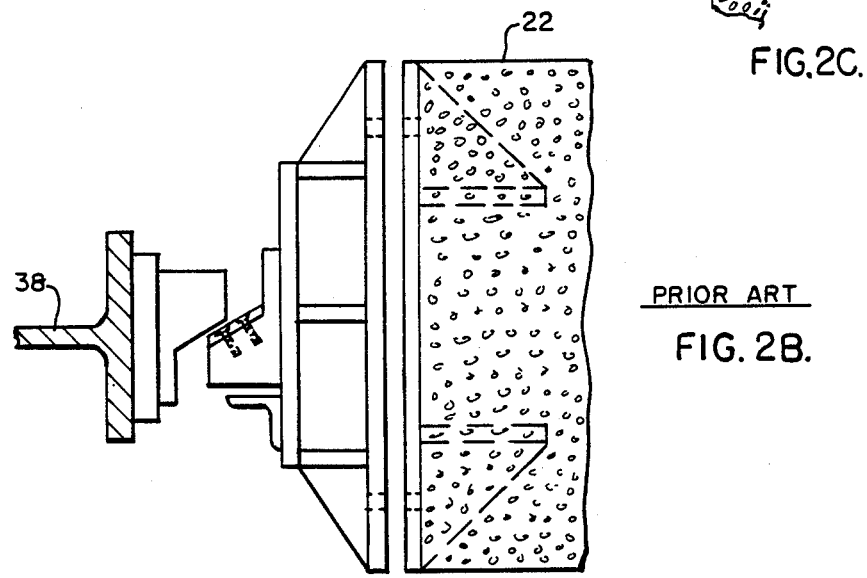
PRIOR ART
FIG. 2B.

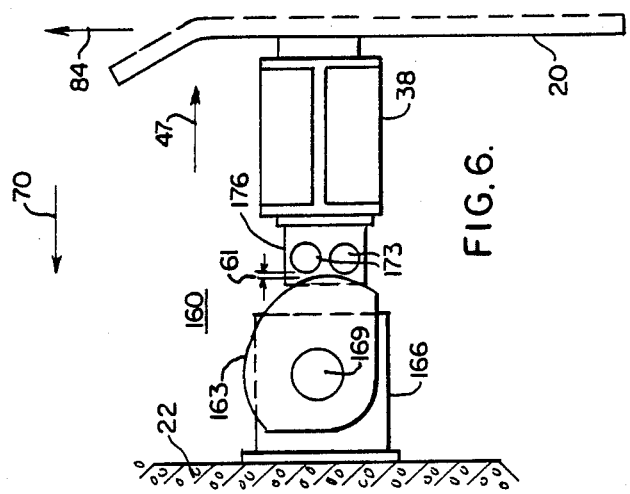
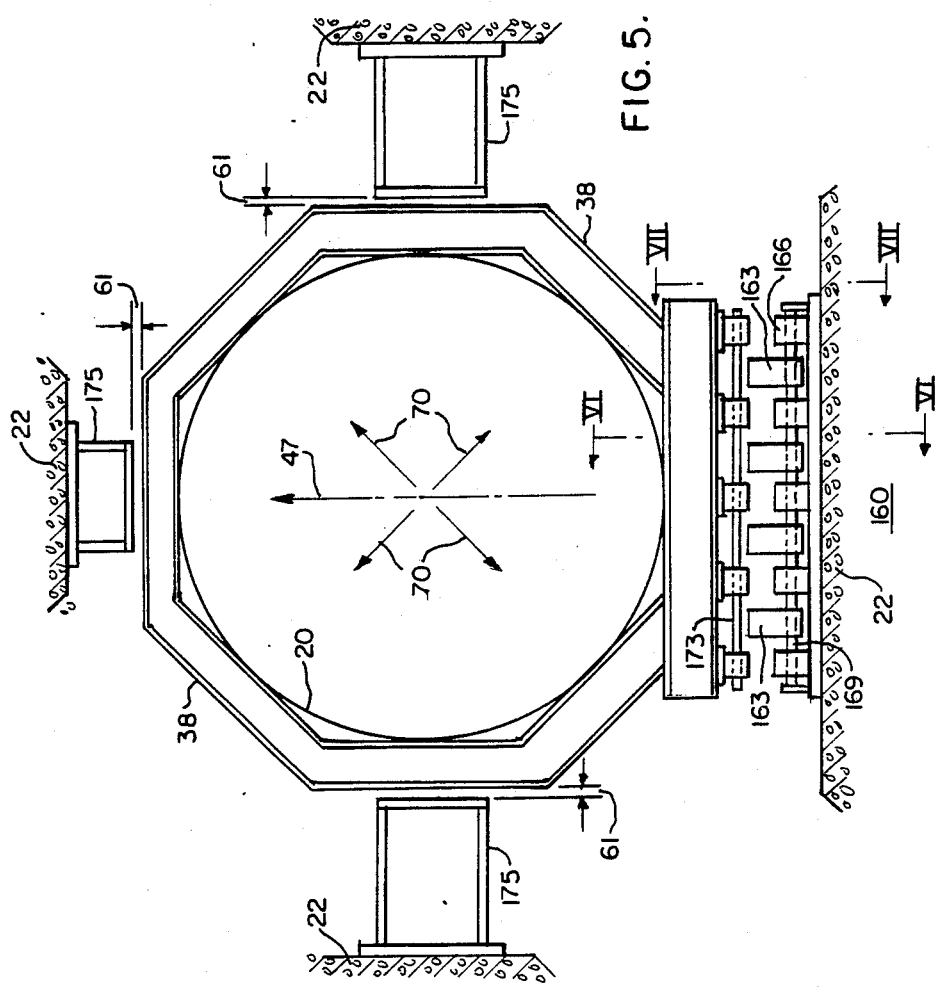

STEAM GENERATOR UPPER SUPPORT HAVING THERMAL DISPLACEMENT COMPENSATION

TECHNICAL FIELD

The invention relates to support arrangements for nuclear power plant steam generators, and more particularly to a steam generator upper support having thermal displacement compensation.

BACKGROUND OF THE INVENTION

Nuclear power plant steam generators must be able to withstand loading forces, such as that occurring under seismic events and postulated accident conditions, without damage to either the shell or the internals of the steam generator, such as the tube bundle and associated supports. The steam generator must also be restrained from large movements during these events so as to prevent damage to the associated piping. Resisting these loading forces requires an assembly which can accommodate steam generator movement since the disposition of the steam generator varies during heat up and cool down of the reactor coolant due to thermal expansion of both the piping attached to the steam generator as well as the generator shell.

From a cool down temperature which is typically about 70° F. (21° C.) to a typical operating temperature of about 550° F. (288° C.), the steam generator will move laterally due to thermal growth of the attached piping and grow or thermally expand in the vertical and radial directions due to thermal growth of the steam generator shell. The direction of lateral growth is along a line corresponding to the hot leg from the reactor vessel which enters the steam generator (see FIG. 1). After heat up of the steam generator, the lateral supports radially spaced about the upper portion of the steam generator and secured to a typically concrete housing surrounding the steam generator, which is a component of the containment building, must not leave a gap greater than 1/16 in. (0.16 cm). This nominal gap, which is essentially zero, is the maximum allowable to insure adequate support under typical loading forces.

As shown by FIG. 1, the means typically employed for resisting these loading forces is the use of snubbers disposed between the steam generator support, commonly referred to as a ring girder, and the concrete housing. Snubbers are typically mechanical or hydraulic devices, much like an automobile shock absorber, which allow for very slow (e.g., 0.05 in./min.) extension and retraction such as occurs during reactor coolant loop heat up and thermal expansion of a steam generator, but become rigid and resist sudden displacement such as would occur under seismic loading. These snubbers are typically disposed on the steam generator in the direction of lateral growth, and oriented generally parallel with that line. Snubbers are relatively large and can require extensive maintenance and testing to insure their proper operation. The use and care of numerous snubbers can thus result in considerable expense to a nuclear power plant operator. Radially spaced about the steam generator in areas not supported by the snubbers are vertically-faced support blocks (or bumpers) which also provide restraint for the steam generator during these loading events.

It is noted that relatively maintenance-free bumpers have been used for steam generator restraint wherever the gap between the bumper and the steam generator decreases during plant heat up (i.e., in the direction of lateral movement), such that a nominal zero inch gap can be achieved during the plant's normal operating (i.e., hot) mode. (See FIG. 2). However, this design does not provide for a 0" nominal gap at bumper locations where the gap typically increases during plant heatup to its normal operating condition, and requires shims between the bumper and the housing.

Although conventional steam generator upper support arrangements can adequately resist these loading forces, the size and number of snubbers needed can be quite expensive to use and maintain. It would thus be advantageous if the need for snubbers could either be totally obviated, or at least their number reduced. Such a support assembly must also be able to fully support the steam generator after heat up so as to allow for thermal expansion of the shell of the steam generator.

DISCLOSURE OF THE INVENTION

It is therefore an object of the present invention to provide a steam generator support having thermal expansion compensation which is simpler to maintain than prior art devices.

It is another object of the present invention to provide a steam generator upper support which will maintain a zero or nominal gap between the steam generator and the concrete housing surrounding the steam generator in order to resist postulated loading forces.

The above objects are attained by the present invention, according to which, briefly stated, a radial support assembly provides a direct load path for loading forces between a generally cylindrical shell member of a steam generator and a housing generally surrounding the shell member, wherein the support assembly allows for free thermal expansion of the shell member to be supported. The radial support assembly comprises a ring girder generally encircling the shell member to be supported, a plurality of rigid support blocks secured to the housing and radially spaced about the shell member, and a compensating support means operably associated between the housing and the ring girder and generally disposed within the load path. The compensating support means is responsive to thermal expansion of the shell member such that a nominal gap is substantially maintained between the rigid support blocks of the support arrangement and the ring girder such that loading forces, such as seismic forces, are resisted by the support assembly.

BRIEF DESCRIPTION OF THE DRAWINGS

Various other objects, features, and advantages of the invention will become more apparent by reading the following detailed description in conjunction with the drawings, which are shown by way of example only, wherein:

FIGS. 2A, 2B and 2C are three views of a prior art bumper arrangement;

FIG. 5 is top plan view of a second embodiment of the present invention, a steam generator upper support variable shim;

FIG. 6 is a view taken along the line VI—VI of FIG. 5;

FIG. 12 is a composite elevational view of the device.

DESCRIPTION OF THE VARIOUS EMBODIMENTS

Figure 1:
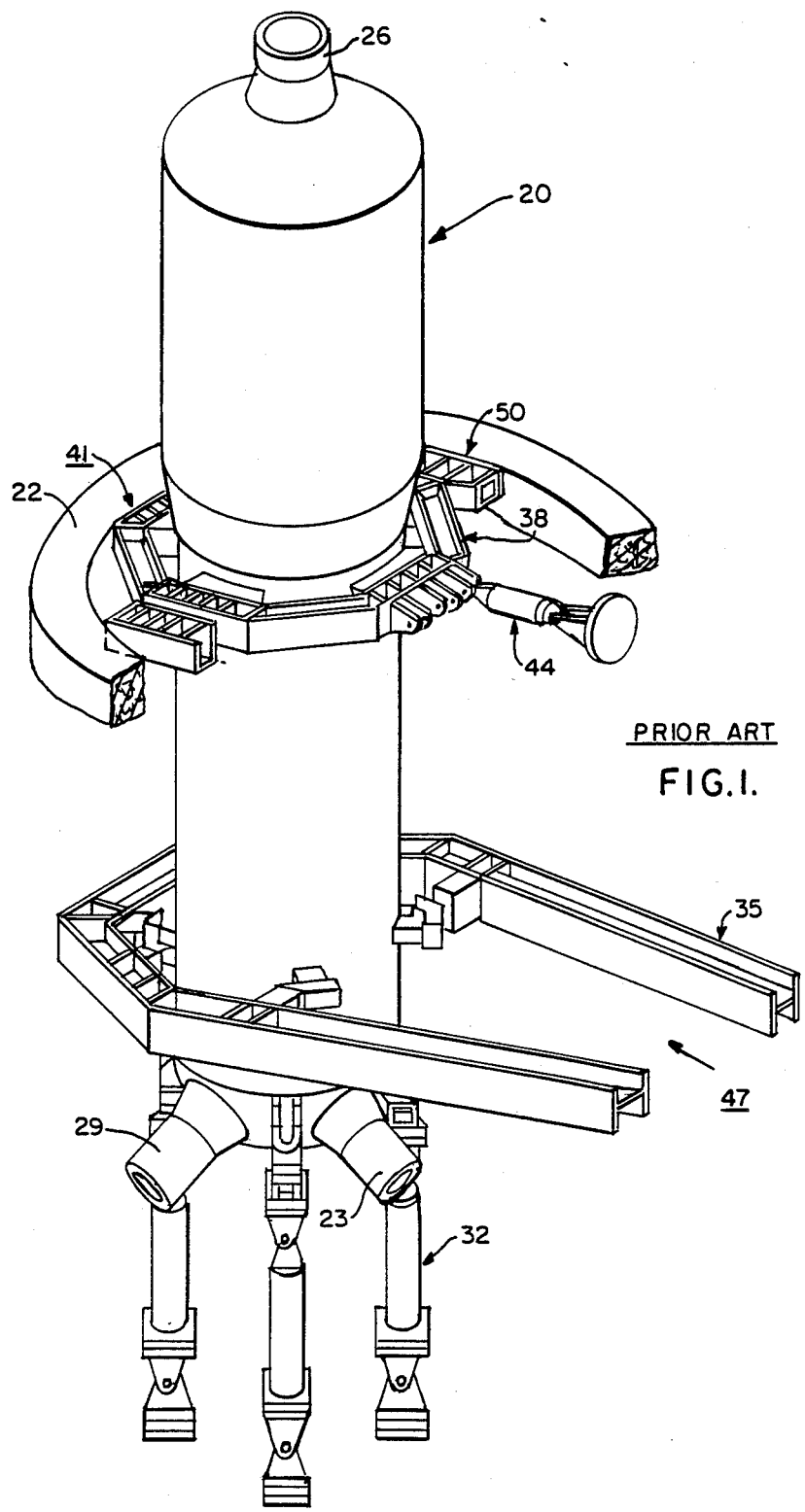
FIG. 1 shows a typical prior art method of supporting a steam generator.

Referring now to the drawings in detail, the several embodiments of the steam generator upper support of the present invention will be more fully described hereinafter. As shown in FIG. 1, an exemplary steam generator 20 is disposed within a containment building (not shown) a nuclear power plant within a generally circular housing 22 typically made of concrete, which generally surrounds the steam generator. A hot leg pipe or conduit 23 from the nuclear reactor vessel (not shown) delivers heated coolant, typically water, to the steam generator. The water flows through an inverted U-shaped tube bundle within the steam generator 20 to convert feedwater therein to steam, which exits a steam outlet 26 and flows on to a steam turbinegenerator (not shown) for the production of electricity. The reactor coolant, having transferred its heat to the feedwater to convert it to steam exits the steam generator 20 via a cold leg pipe or conduit 29 and flows back to the reactor vessel.

The steam generator 20 is supported vertically from below typically by pinned support columns 32 between the floor of the containment building and the bottom of the steam generator 20, and a lower lateral support 35. The conventional steam generator upper support takes the form of a ring girder 38 which generally encircles the steam generator 20, and a support arrangement 41, including numerous large snubbers 44 (one of which is shown), secured between the ring girder 38 and the concrete housing 22. Since the direction of lateral thermal expansion is generally along a line 47, that is, along the hot leg 23, adjacent or along this path is generally where these prior art snubbers 44 are disposed. Conversely, lateral movement during cool down and steam generator 20 thermal contraction is in the opposite direction. In other positions radially about the steam generator are hot stops 50 of various design.

Thermal Displacement Compensating Bumper Arrangement

Figure 3:
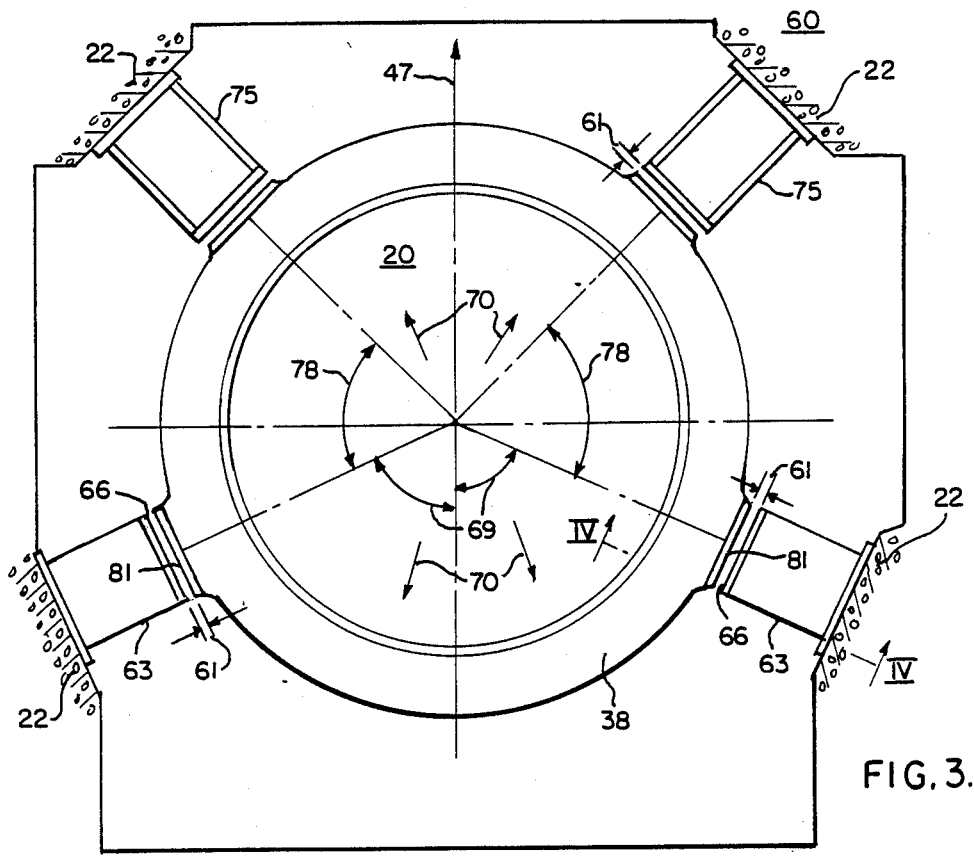
FIG. 3 is a top plan view of the first embodiment of the present invention, a steam generator upper support thermal displacement compensating bumper arrangement.
Figure 4:
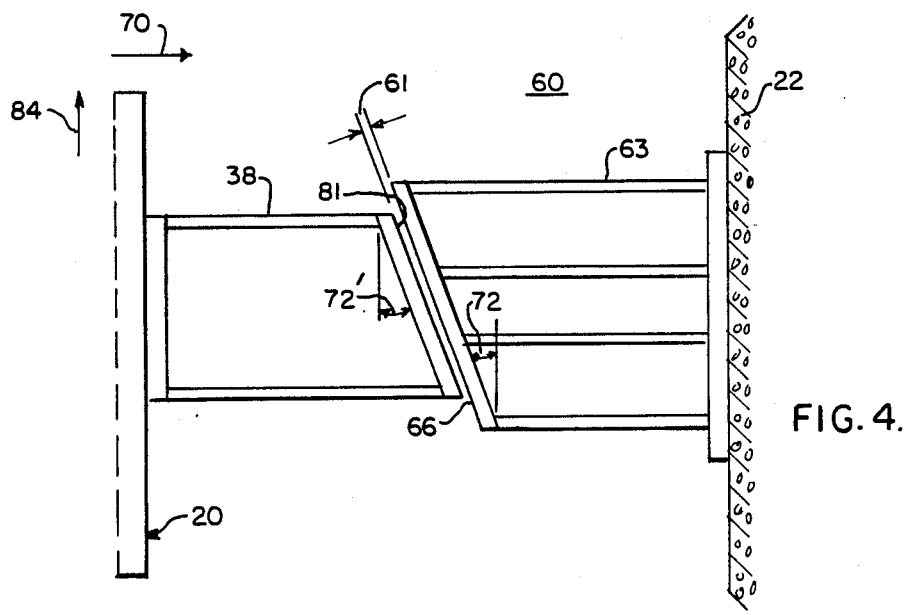
FIG. 4 is a view taken along the line IV—IV of FIG. 3.

Referring now to FIGS. 3 and 4 a first embodiment of the present invention will now be described in detail, a steam generator thermal displacement compensating bumper arrangement 60. In this embodiment a set of four restraint bumpers or support blocks is strategically arranged to take advantage of various reactor coolant loop and steam generator thermal motions, such that a small (less than 0.0625 in. or 0.159 cm) or nominal gap 61 can be maintained between the steam generator 20 and the thermal displacement compensating bumper arrangement 60 during operating conditions. Preferably for this arrangement the ring girder 38 is of a generally circular configuration, and is fully insulated with the steam generator shell.

Radially spaced about the steam generator 20 and secured to the housing 22 are preferably two bumpers 63 having an incline face 66 which are disposed on the housing 22 at a predetermined angle 69 with respect to the thermal movement 47. In order to make optimum use of steam generator radial thermal expansion, generally designated at 70, which typically is on the order of about 0.28 in. (0.71 cm) as given by the equation $$\delta = \alpha L \Delta T \text{ (where } \alpha \text{ has a value of 7E-6)},$$

the inclined bumpers 63 are oriented at an angle 69 of about 65° from the thermal movement 47, or the hot leg centerline, in order to maintain the nominal gap 61 between the bumpers and the ring girder 38 as the steam generator 20 and ring girder 38 thermally expand. Also, the inclined face 66 of the bumpers 63 has an included angle 72 of approximately 19° from the vertical so as to maintain this gap 61.

A pair of rigid support blocks 75 are also secured to the housing 22 and project toward the steam generator 20 and are disposed at an angle 78 of about 70° with respect to each of the inclined bumpers 63. These rigid support blocks 75 preferably have a substantially vertical surface adjacent the ring girder 38. The ring girder 38 in an area adjacent each of the inclined bumpers 63, has a slanted surface 81 which corresponds to that of the inclined bumpers 63; that is, at an angle 72' approximately 19° from the vertical.

Typically, vertical growth, designated at 84, of the steam generator 20 due to thermal expansion is about 1 in. (2.54 cm). Additionally, the lateral movement of the steam generator along path 47 during plant heat up is approximately 1.5 in. (3.81 cm) along the centerline of the hot leg, or along the direction of the load path. The radial expansion 70 of the steam generator shell, and consequently the ring girder 38, is dependent upon the change in temperature of the steam generator 20. Typically, the ambient or cool down temperature of the steam generator 20 is about 70° F. (21° C.) and the operating temperature is about 550° F. (288° C.). With this temperature difference the radial expansion of the steam generator 20, which typically has a radius of 84 in. (213 cm), is approximately 0.28 in. (0.71 cm).

For a steam generator lateral movement 47 of 1.5 in. (3.81 cm) along the hot leg of the steam generator 20 and with the inclined bumpers 63 placed at an angle 69 of 65° from this centerline and an angle 72 of 19° from vertical, then the increase in the gap 61 from the inclined bumpers 63 to the ring girder 38 is given by the equation $\delta = 3.81 \text{ cm} \times \sin 25° \times \cos 19° = 1.52$ cm. However, this increase in gap is offset by the decrease in the gap 61 due to the radial expansion 70, which will be about $0.71 \text{ cm} \times \cos 19° = 0.67$ cm. Also, this gap 61 is closed due to the steam generator 20 vertical growth 84 of 1 in. (2.54 cm). This gap closing parameter is given by the equation $\delta = 2.54 \text{ cm} \times \sin 19° = 0.84$ cm. Therefore, the total change in gap 61 is thus about 0.004 in. (0.01 cm) (1.52 cm-0.67 cm-0.84 cm), which is substantially within the nominal value of 0.0625 in. or 0.16 cm.

Thus a nominal gap 61 is maintained between the ring girder 38, the support blocks 75, and inclined bumpers 63 of the compensating bumper arrangement 60 such that loading forces, those due to seismic events or postulated accident conditions for example, can be adequately resisted by the thermal displacement compensating bumper arrangement 60 at all times. Therefore the combination of the steam generator lateral 47, radial 70, and vertical 84 thermal displacement and expansion, and the predetermined bumper configuration and orientation will substantially maintain the nominal gap 61 between the steam generator 20 and the steam generator thermal displacement compensating bumper arrangement 60 at typical operating temperatures.

The bumper orientation and angles given above are provided for illustrative purposes, and may vary slightly from plant to plant depending upon such factors as reactor coolant loop layout, operating temperatures, support elevations, etc.

Steam Generator Upper Support Variable Shim

Figure 7:
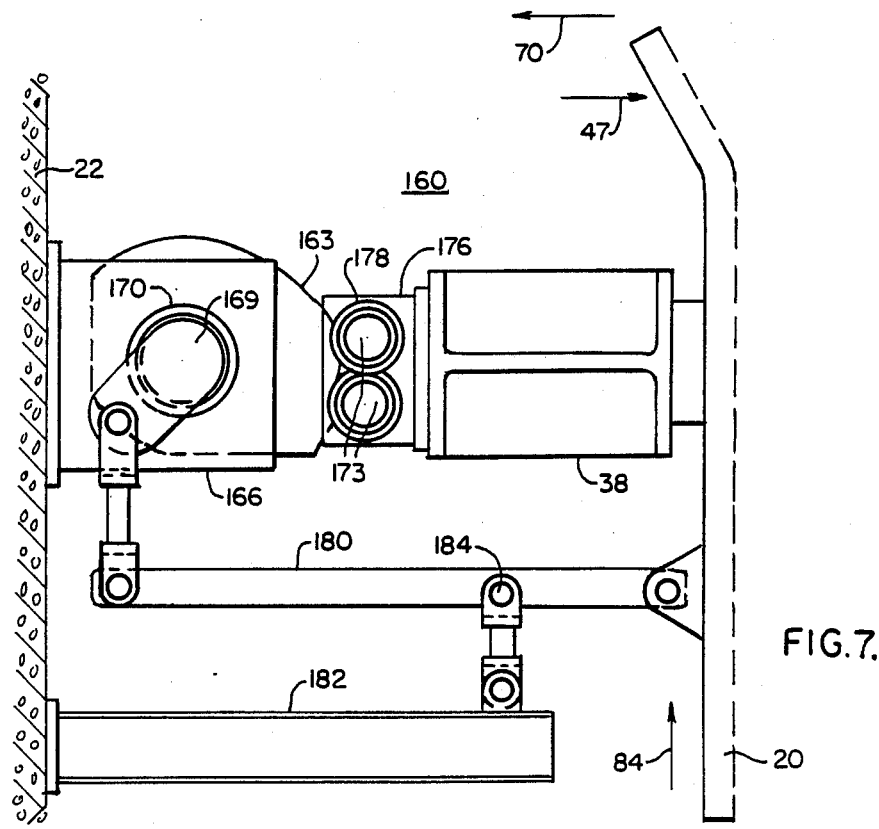
FIG. 7 is a view taken along the line VII—VII of FIG. 5.

Referring now to FIGS. 5-7, a second embodiment of the present invention will be described in detail, a steam generator upper support variable shim 160. Preferably, in this embodiment the ring girder 38 encircling the steam generator 20 is of an octagonal shape. Also, three vertical-faced support blocks 175 are radially disposed at about 90° intervals about the upper portion of the steam generator 20. The steam generator upper support variable shim 160 has a thermal compensating support means which comprises a cam and lever arrangement that utilizes the vertical 84 thermal growth of the steam generator 20 to manipulate a plurality of cam-shaped spacers or bumpers 163 placed between the steam generator 20 and he housing 22 of the containment building structure surrounding the steam generator. Preferably the variable shim 160 is placed along the path 47 of lateral movement during thermal expansion, preferably, on a side of the steam generator 20 away from that of the direction of the lateral 47 movement or adjacent the hot leg side.

Secured to the housing 22 and projecting towards the steam generator 20 is a plurality of bumper cams 163 which are rotatably mounted to a bumper cam bearing mount 166 by means of a shaft 169 and cam roller bearing 170, which is secured, for example by bolting to the concrete housing 22. The bumper cams 163 have a leading edge which is adapted to continually maintain contact with a pair of bumper rods 173 rotatably mounted to the steam generator upper support ring girder 38 by a bumper rod bearing mount 176 and roller bearings 178. The bumper cams 163 are disposed generally parallel with the direction of lateral growth 47 within the load path. The bumper rods 173 are in turn generally parallel to the cam shaft 169. A lever arrangement 180 is secured between the steam generator shell 20 and the cam shaft 169 which controls the bumper 163 rotation, since the vertical 84 steam generator growth is proportional to the lateral 47 steam generator movement. A support arm 182 secured to the housing 22 also provides a pivot point 184 for the lever arrangement 180. The bumper cams 163 maintain a nominal 0 in. gap 61 between the steam generator 20 and the variable shim support arrangement 160 both during power plant heat up, and in non-operating conditions. The bumper cams 163 and bumper rods 173 are mounted on roller bearings so as to minimize the load required to rotate the bumper cams 163.

Single Snubber Steam Generator Upper Support

Figure 9:
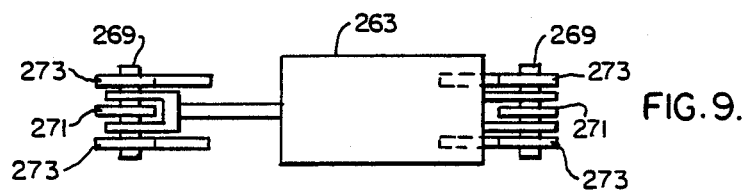
FIG. 9 is a view taken along the line IX—IX of FIG. 8.
Figure 10:
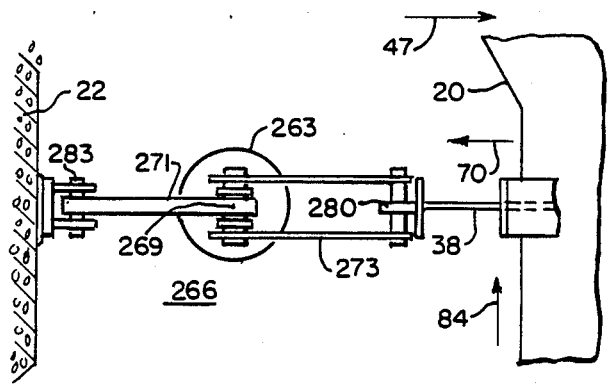
FIG. 10 is a view taken along the line X—X of FIG. 8.
Figure 8:
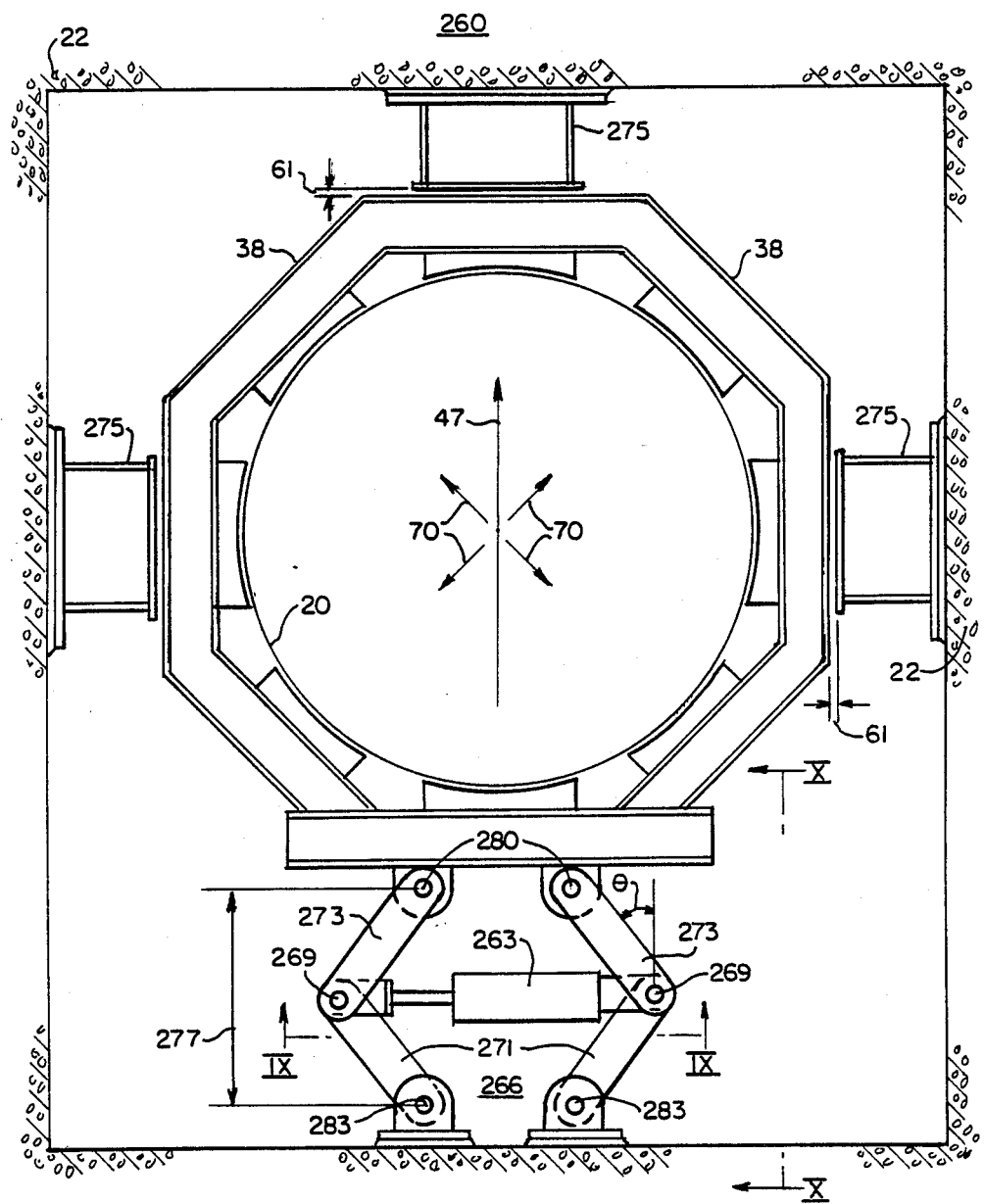
FIG. 8 is a top plan view of a third embodiment of the present invention, a single snubber steam generator upper support.
Figure 11:
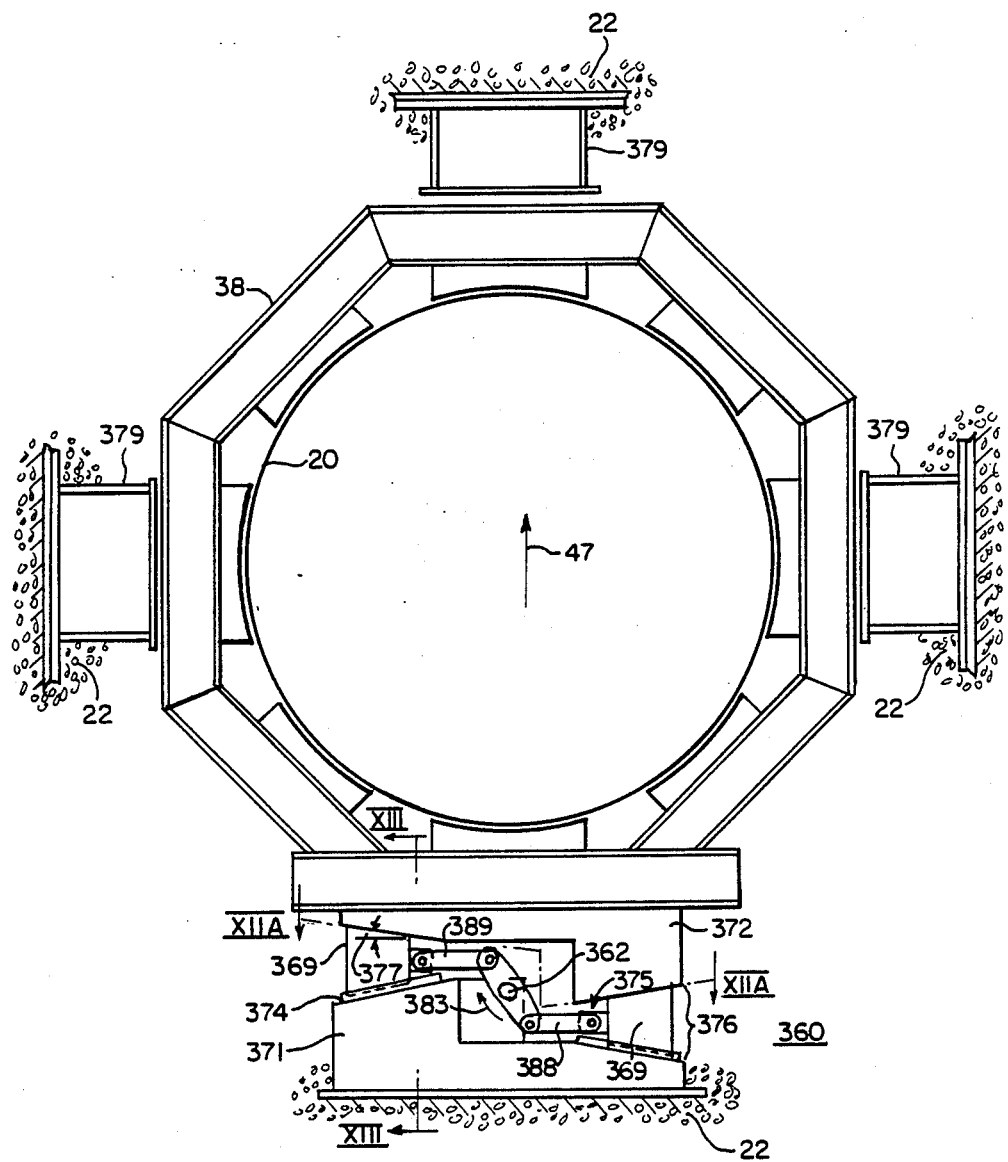
FIG. 11 is a top plan view of a fourth embodiment of the present invention, a steam generator upper support self-adjusting shim.
Figure 12A:
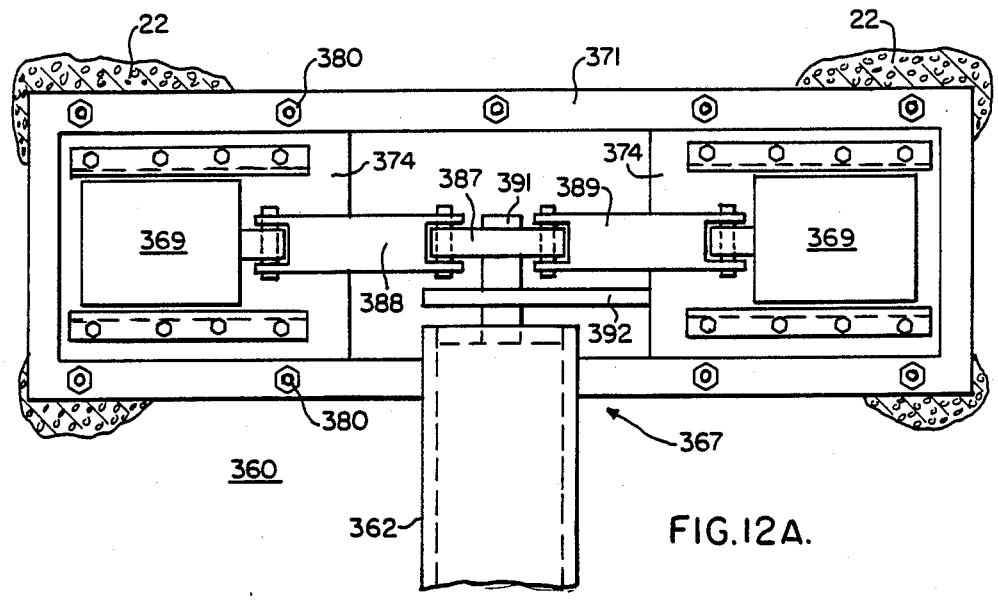
FIG. 12A is a view taken along the line XIIA—XIIA of FIG. 11.
Figure 12B:
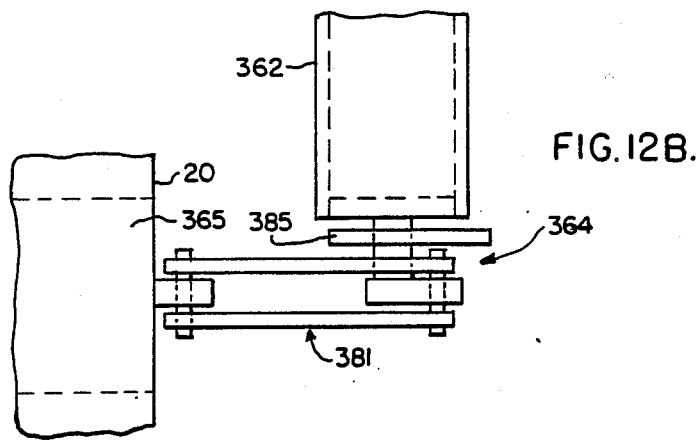
FIG. 12B is a view taken along the line XIIB—XIIB of FIG. 14.
Figure 13:
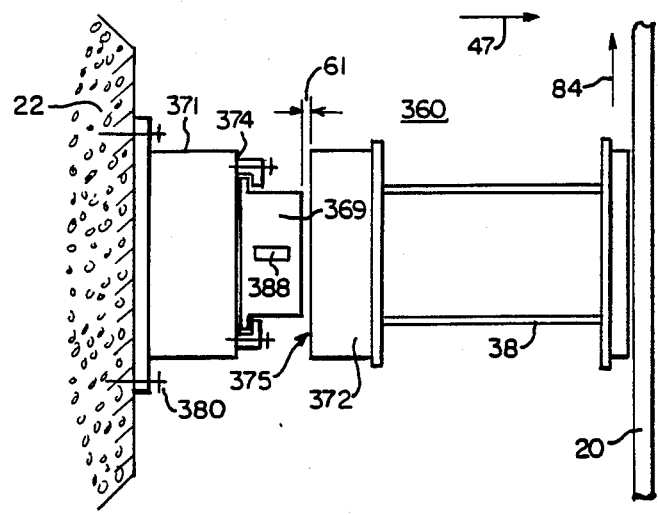
FIG. 13 is a view taken along the line XIII—XIII of FIG. 11.
Figure 14:
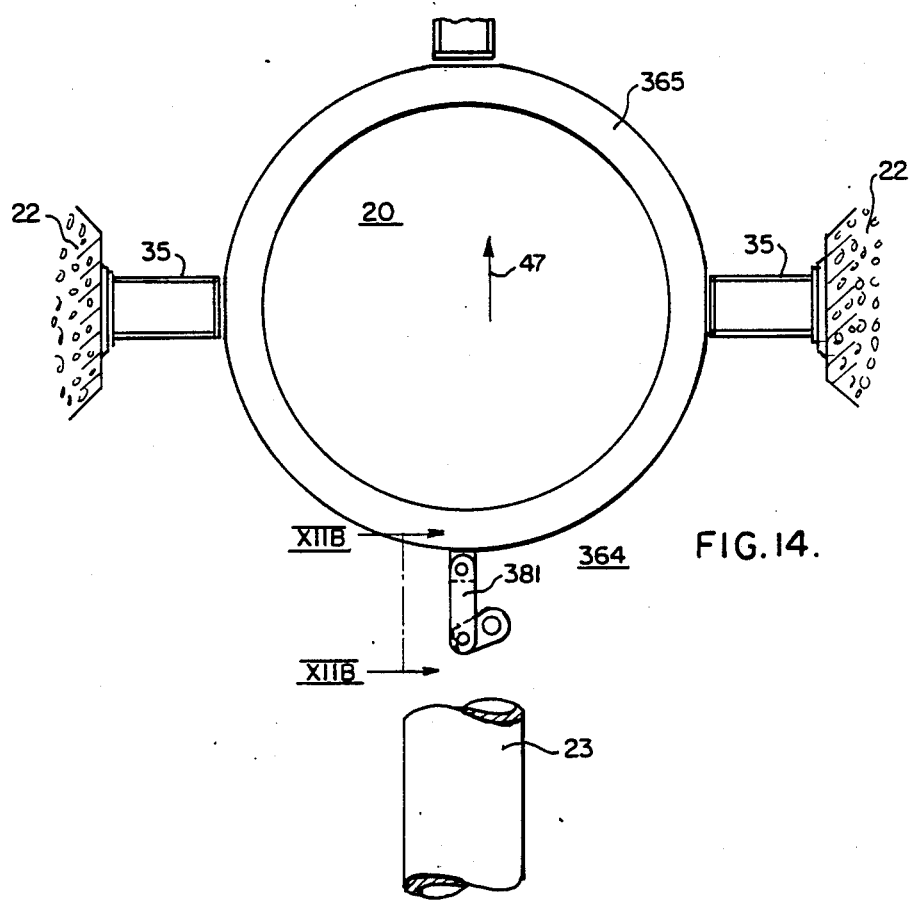
FIG. 14 is a sectional view of the lower end of the steam generator.

Referring to FIGS. 8-10, a third embodiment of the present invention will now be described in detail, a single snubber steam generator upper support 260. The third embodiment of the present invention comprises a single snubber 263 which is secured between a set of rigid links 266 arranged in a V-shape, which are in turn secured between the housing 22 and the ring girder 38. Preferably, the ring girder 38 comprises a generally octagonal shape. In this design a single smaller snubber 263 can be used in place of the multiple, large snubbers now used to resist seismic or accident loads, while still permitting a free thermal movement and expansion of the steam generator 20 to provide support both during plant operating and non-operating modes.

The single snubber steam generator upper support 260 has a thermal compensating support means comprising a snubber 263 and link arrangement 266 which, in this example, is shown disposed between the ring girder 38 and the housing 22 on a side of the steam generator 20 which is directly opposite that of the direction of lateral movement 47 of the steam generator 20 during plant heat up. Each of the sets of links 266 arranged in a V-shape is hinged at its respective apex 269 where the ends of the snubber 263 are secured thereto. In link 271 between the housing 22 and the snubber 263, a single rigid link is used, whereas as between the snubber 263 and the ring girder 38 a double rigid link 273 is preferably utilized so as to make it more supporting and to facilitate fitup of the assembly. Alternatively, both links 271, 273 may be single or double. Radially spaced about the steam generator 20 and secured to the housing 22, are support blocks 275.

Whereas the distance, designated at 277, between the housing 22 and the ring girder 38 is typically about 34.5 in. (87.63 cm) in the cool down state, the length of each individual link on leg 271, 273 is dependent upon the angle 8 that the links 271, 273 make with respect to the ring girder 38 and the housing 22. This determines the length of the snubber 263 stroke since the larger the angle $\theta$, the less will be the relative movement of the respective apexes 269 of the links 266 compared with the thermal movement 47 of the steam generator 20. Also, this angle $\theta$ determines the load which will be absorbed by both the links 271, 273 and the single snubber 263. The table below shows the relative dimensions of the link length and snubber strokes for the various typical dimensions of the angle $\theta$, assuming a total support load of 2000 kip (907 m.Ton), a thermal lateral movement of 1.5 in. (3.81 cm.), and a mechanism length 277 of 34.5 in. (87.63 cm.) (cool-down state).

| SUPPORT LOAD/GEOMETRY TABLE | | | | |
| --- | --- | --- | --- | --- |
| $\theta =$ | 17° | 20° | 25° | 30° |
| length of links 271, 273 | 18.04 in. (45.82 cm) | 18.36 in. (46.63 cm) | 19.03 in. (48.34 cm) | 19.92 in. (50.60 cm) |
| snubber stroke, 263 | 8.2 in. (20.83 cm) | 5.36 in. (13.61 cm) | 3.72 in. (9.45 cm) | 2.86 in. (7.26 cm) |

-continued

| SUPPORT LOAD/GEOMETRY TABLE | | | | |
| --- | --- | --- | --- | --- |
| load on each link, 271, 273 | 1002 kip (455 m.Ton) | 1020 kip (463 m.Ton) | 1057 kip (480 m.Ton) | 1106 kip (502 m.Ton) |
| load on snubber, 263 | 130 kip (59 m.Ton) | 400 kip (181 m.Ton) | 687 kip (312 m.Ton) | 947 kip (430 m.Ton) |

The single snubber support arrangement 260 operation can be thought of in terms of a reverse cable analogy. Whereas a small load hung in the middle of a horizontal cable will result in a large tension load in the cable itself, a large load applied to the rigid struts will result only in a small load on the snubber. A hydraulic or mechanical velocity limiting snubber may be utilized in this embodiment. This support arrangement permits the use of fewer and smaller snubbers for the steam generator upper support with a corresponding decrease in maintenance and inspection costs, while maintaining high capacities for potential seismic and postulated accident loads.

As in the previous embodiment, preferably three vertically faced support blocks 275 are radially disposed about the steam generator 20 such that a nominal gap 61 will be maintained between the support blocks 275 and the ring girder 38 as the steam generator 20 thermally expands. Preferably the pin joint locations 280, 283 between the double link 273 and the ring girder 38, as well as between the single link 271 and the concrete housing 22, respectively, comprise spherical ball bushings to accommodate the 1 in. (2.54 cm) vertical growth 84 of the steam generator during thermal expansion and plant heat up.

Steam Generator Upper Support Self-Adjusting Shim

Referring now to FIGS. 11-14, a fourth embodiment of the present invention will now be more fully described, a steam generator upper support self-adjusting shim 360. The self-adjusting shim 360 comprises a vertical drive shaft 362 which is secured near its lower end 364 to the steam generator 20 in the region of its tubesheet 365, and has its upper end 367 secured to a pair of opposed, wedge-shaped shims 369. The wedge-shaped shims 369 are each disposed between a pair of correspondingly tapered support members 371,372 secured to the concrete housing 22 and the ring girder 38, respectively. The support member 371 may also include a pair of support brackets 373 for each shim 369. Preferably, in this embodiment, the ring girder 38 is of an octagonal configuration. Each of the support members 371,372 has a pair of opposed, tapered surfaces 374,375 which cooperate to form two tapered openings 376 matching the included angle 377 of the wedge-shaped shims 369. Radially spaced about the steam generator 20 and secured to the housing are rigid support blocks 379, such as by bolting 380. In this manner, a nominal 0 in. gap 61 is maintained between the ring girder 38 and the concrete housing 22 so as to provide restraint for the steam generator 20 for seismic and postulated accident conditions at all times.

The lower end 364 of the drive shaft 362 is pivotally linked 381 to the steam generator tubesheet 365. This connection to the tubesheet region 365 is advantageous because it provides a solid link between the steam generator 20 and the self-adjusting shim support 360, so as to insure proper operation of the support 360, as will be more fully described hereinafter. The linkage 381 is arranged such that, as the steam generator 20 thermally moves during plant heat up, as indicated by arrow 47, the drive shaft 362 will rotate in the clockwise direction; i.e., as viewed from above and indicated by arrow 383 in FIG. 11. As an additional support, the linkage 381 includes a lower drive shaft bearing support 385, secured to the housing 22.

The upper end 367 of the drive shaft 362 is also pivotally linked to each of the wedge-shaped shims 369. A coupling 387 has each of its ends 388,389 pivotally linked to one of the shims 369. An upper drive shaft bearing 391, and bearing support 392 connected with the housing 22 provides stability for the driveshaft 362.

The steam generator upper support self-adjusting shim 360 operates as follows:

As the steam generator 20 thermally moves 47 and expands, the linkage 381 on the lower end 364 of the drive shaft 362 causes it to rotate 383. As the steam generator moves 47, the support members 371,372 separate, so as to increase the tapered openings 376. However, the rotation of the drive shaft 362 causes the wedge-shaped shims 369 to translate or slide towards each other, with respect to the figures, so as to maintain the nominal 0 in. gap 61 therebetween. Preferably the surfaces of the shims 369 are coated with a durable, self-lubricating material to facilitate sliding motion between the shims 369 and the tapered surfaces 374,375. The required coefficient of friction between the wedge-shaped shims 369 and the tapered surfaces 364,375 of the support members 371,372 is dependent upon their corresponding included angles 377 in order that the shims 369 require essentially no restraint to keep them in place when the steam generator 20 applies a load to the support assembly 360. For example, an angle 377 of about 5.71 degrees would produce an effective coefficient of friction of 0.1, whereas an angle 377 of 16.70 degrees corresponds to a coefficient of about 0.3. This is the preferred range for the shape of the shims 369 and the support members 371,372. It is important to provide for as minimal amount of friction between the surfaces as is practicable.

The force required to slide the shims 369 should be minimized in the unlikely event of a sustained load on the support 360 coincident with plant cooldown. For example, assuming a pipe rupture, such as steam line 26, a sustained load of about 200 kip may be coincident upon the support for a period of about ten to fifteen minutes. This would result in a relatively quick cooldown of the plant, and corresponding contraction of the steam generator 20. Less effort to translate the shims 369 results in a lesser load on the linkages 381 and 387. Thus the support 360 is capable of adequately accommodating the loading forces on the steam generator 20 during the postulated accident and seismic conditions at all times.

It is to be understood that, instead of being configured to result in a clockwise as rotation of the drive shaft 362 (as shown from above in FIG. 11), the lower linkage 381 could be designed to produce a counter-clockwise rotation. In this configuration, the wedge-shaped shims 369 would be translated by their respective linkages 387, 388, 399 to be directed away from each other as the steam generator 20 thermally moves. Moreover, the shims 369 would have their wider ends connected to the links 388,389, and the tapered openings 376 would also be opposite to that shown in FIG. 11.

While specific embodiments of the present invention have been described in detail, it will be appreciated by those skilled in the art that various modifications and alterations could be developed in light of the overall teachings of the disclosure. Accordingly, particular arrangements disclosed are meant to be illustrative only and not limiting as to the scope of the invention which is to be given full breadth of the appended claims and in any and all equivalents thereof.

We claim:

1. A radial support assembly providing for a direct load path for loading forces between a generally cylindrical shell member and a housing generally surrounding the shell member, the support assembly also allowing for free thermal expansion and contraction of the shell member to be supported, said radial support comprising:
   a ring girder generally encircling the shell member to be supported;
   a plurality of rigid support blocks secured to the housing and radially spaced about the shell member; and
   compensating support means operably associated with the housing and the ring girder and disposed proximate to the load path, said compensating support means responsive to said thermal expansion and contraction wherein a nominal gap is substantially maintained between said rigid support blocks of the support arrangement and the ring girder such that said loading forces are resisted by the radial support assembly.

2. The support assembly as recited in claim 1, wherein said compensating support means comprises a pair of bumpers having an inclined face, said inclined bumpers disposed on the housing and oriented at a predetermined angle with respect to the load path, and the ring girder having a correspondingly slanted surface adjacent said inclined bumpers such that a nominal gap is substantially maintained between the ring girder and said inclined bumpers.

3. The support assembly as recited in claim 1, wherein said compensating support means comprises a plurality of bumper cams rotatably mounted on the housing by means of a cam shaft in a side by side relationship oriented generally perpendicular to the load path, at least one bumper rod rotatably mounted on the ring girder opposite said bumper cams generally parallel to the cam shaft, and a pivoted linkage having its ends operably connected between the shell member and said cam shaft whereby said bumper cams are rotated during thermal movement of the shell member such that a nominal gap is substantially maintained between said bumper cams and the bumper rod.

4. The support assembly as recited in claim 1, wherein said compensating support means comprises a pair of opposed pivoted links arranged in a V-shaped manner and having their respective ends secured between the ring girder and the housing such that their apexes are directly opposed, and a snubber connected between said apexes and oriented generally perpendicular to the load path.

5. The support assembly as recited in claim 1, wherein said compensating support means comprises a vertical drive shaft having its lower end pivotally connected to the shell member, and the upper end thereof operably connected to a pair of opposed, wedge-shaped shims, said shims cooperatively associated with a pair of correspondingly slanted support members, one of each of said support members being secured to the ring girder and the housing so as to form a pair of tapered openings into which said shims are received, such that the drive shaft is rotated during thermal movement of the shell member so as to translate said shims within said tapered openings whereby a nominal gap is maintained between said shims and said support members.

6. A support assembly providing for a direct load path for seismic and postulated accident forces between a steam generator and a housing generally surrounding the steam generator, the support assembly allowing for free thermal expansion and contraction of the steam generator, said steam generator support assembly comprising:
   a generally circular ring girder encircling an upper portion of the steam generator to be supported;
   a plurality of rigid support blocks secured to the housing and radially spaced about the steam generator; and
   a pair of bumpers having an inclined face said inclined bumpers disposed on the housing and oriented at a predetermined angle with respect to the load path, the ring girder having a correspondingly slanted surface adjacent said inclined bumpers such that a nominal gap is substantially maintained between the ring girder and said inclined bumpers.

7. The steam generator support as recited in claim 6, wherein said inclined bumpers are oriented at an angle of sixty-five degrees with respect to the load path.

8. The steam generator support as recited in claim 7, wherein said inclined bumpers and said slanted ring girder surface each have an included angle of approximately nineteen degrees.

9. The steam generator support as recited in claim 7, wherein two said support blocks are secured to the housing on a side opposite said bumpers and oriented at an angle of about one hundred thirty-five degrees with respect to the load path.

10. A support assembly providing for a direct load path for seismic and postulated accident forces between a steam generator and a housing generally surrounding the steam generator, the support assembly allowing for free thermal expansion and contraction of the steam generator, said steam generator support assembly comprising:
   a generally octagonal shaped ring girder encircling an upper portion of the steam generator to be supported;
   a plurality of rigid support blocks secured to the housing and radially spaced about the steam generator; and
   a plurality of cams rotatably mounted on the housing in a side-by-side relationship oriented generally perpendicular to the load path, a pair of bumper rods rotatably mounted on the ring girder opposite said cams, and a pivoted linkage having its ends operably connected between the steam generator and said cams such that a nominal gap is substantially maintained between said cams and bumper rods.

11. The steam generator support as recited in claim 10, wherein said assembly is disposed adjacent an upper portion of the steam generator.

12. The steam generator support as recited in claim 10, wherein said cams have a leading edge surface adapted to maintain contact with said bumper rods as the steam generator thermally expands and contracts.

13. A support assembly providing for a direct load path for seismic and postulated accident forces between a steam generator and a housing generally surrounding the steam generator, the support assembly allowing for free thermal expansion and contraction of the steam generator, said steam generator support assembly comprising:
- a generally octagonal shaped ring girder encircling an upper portion of the steam generator to be supported;
- a plurality of rigid support blocks secured to the housing and radially spaced about the steam generator; and
- an opposed pair of pivoted links arranged in a V-shaped manner and having their respective ends pivotally secured between the ring girder and the housing such that their respective apexes are opposed, and a snubber connected between said apexes and oriented generally perpendicular to the load path for absorbing loading forces.

14. The steam generator support as recited in claim 13, wherein said respective ends of said links are pinned to the ring girder and the housing so as to allow for thermal expansion and contraction of the steam generator in the vertical direction.

15. The steam generator support as recited in claim 13, wherein said assembly is disposed adjacent an upper portion of the steam generator.

16. A support assembly providing for a direct load path for seismic and postulated accident forces between a steam generator and a housing generally surrounding the steam generator, the support assembly allowing for free thermal expansion and contraction of the steam generator, said steam generator support assembly comprising:
- a generally octagonal shaped ring girder encircling an upper portion of the steam generator to be supported;
- a plurality of rigid support blocks secured to the housing and radially spaced about the steam generator; and
- a vertical drive shaft having its lower end pivotally connected to the steam generator, and the upper end thereof pivotally connected to a pair of opposed, wedge-shaped sliding shims, said sliding shims cooperatively associated with a pair of correspondingly slanted support members, one of each of said support members being secured to the ring girder and the housing so as to form a pair of tapered openings into which said sliding shims are received, such that the drive shaft is rotated during thermal movement of the steam generator so as to translate said sliding shims within said tapered openings whereby a nominal gap is maintained between said sliding shims and said support members.

17. The steam generator support as recited in claim 16, wherein said wedge-shaped sliding shims are coated with a lubricant having a low coefficient of friction.

18. The steam generator support as recited in claim 16, wherein said wedge-shaped sliding shims and said slanted support members have an included angle of between about 5 and 17 degrees.

19. The steam generator support as recited in claim 17, wherein said wedge-shaped sliding shims and said slanted support members have an included angle of between about 5 and 17 degrees.

20. A steam generator having a radial support assembly associated with its upper portion providing for a direct load path for loading forces between it and a concrete housing generally surrounding the steam generator, the radial support assembly allowing for free thermal expansion and contraction of the steam generator, said steam generator upper support comprising:
- a ring girder generally encircling the upper portion of the steam generator;
- a plurality of rigid support blocks secured to the concrete housing and each spaced about the steam generator at predetermined locations with respect to the load path; and
- compensating support means operably associated with the concrete housing and the ring girder and disposed proximate to the load path, said compensating support means responsive to said thermal expansion and contraction whereby a nominal gap is substantially maintained between said rigid support blocks of the radial support assembly and the ring girder such that said loading forces are resisted by the steam generator upper support assembly.

21. The steam generator as recited in claim 20, wherein said compensating support means of the steam generator upper support comprises a pair of inclined bumpers having an included angle of nineteen degrees, said inclined bumpers disposed on the housing and oriented at an angle of sixty-five degrees with respect to the load path, and the ring girder having a correspondingly slanted surface adjacent said inclined bumpers such that a nominal gap is substantially maintained between the ring girder and said inclined bumpers.

22. The steam generator as recited in claim 20, wherein said compensating support means of the steam generator upper support comprises a plurality of bumper cams rotatably mounted on the housing by means of a camshaft in a side-by-side relationship oriented generally perpendicular to the load path, two bumper rods rotatably mounted on the ring girder opposite said bumper cams generally parallel to the camshaft, and a pivoted linkage having its ends operably connected between the steam generator and the cam shaft whereby said bumper cams are rotated during thermal movement of the steam generator such that a nominal gap is substantially maintained between said bumper cams and said bumper rods.

23. The steam generator as recited in claim 20, wherein said compensating support means of the steam generator upper support comprises a pair of opposed pivoted links arranged in a V-shaped manner and having their respective ends secured between the ring girder and the housing such that their apexes are directly opposed, and a snubber connected between said apexes so as to be oriented generally perpendicular to the load path.

24. The steam generator as recited in claim 20, wherein said compensating support means comprises a vertical drive shaft having its lower end pivotally connected to the shell member, and the upper end thereof operably connected to a pair of opposed, wedge-shaped shims, said shims cooperatively associated with a pair of correspondingly slanted support members, one of each of said support members being secured to the ring girder and the housing so as to form a pair of tapered openings into which said shims are received, such that the drive shaft is rotated during thermal movement of the shell member so as to translate said shims within said tapered openings whereby a nominal gap is maintained between said shims and said support members.

* * * * *